(12) United States Patent
Hutchison et al.

(10) Patent No.: US 11,003,559 B2
(45) Date of Patent: May 11, 2021

(54) UNDERPERFORMING DRIVE HANDLING IN REDUNDANT ARRAYS

(71) Applicant: International Business Machines Corporation, Armonk, NY (US)

(72) Inventors: Gordon Douglas Hutchison, Eastleigh (GB); Ian Boden, Southampton (GB); John Paul Agombar, Winchester (GB); Alastair Cooper, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 16/364,316

(22) Filed: Mar. 26, 2019

(65) Prior Publication Data
US 2020/0310932 A1 Oct. 1, 2020

(51) Int. Cl.
*G06F 11/20* (2006.01)
*G06F 3/06* (2006.01)

(52) U.S. Cl.
CPC ........ *G06F 11/2094* (2013.01); *G06F 3/0604* (2013.01); *G06F 3/0619* (2013.01); *G06F 3/0631* (2013.01); *G06F 3/0644* (2013.01); *G06F 3/0653* (2013.01); *G06F 3/0659* (2013.01); *G06F 3/0689* (2013.01); *G06F 2201/82* (2013.01)

(58) Field of Classification Search
CPC .. G06F 11/2094; G06F 3/0644; G06F 3/0659; G06F 3/0689; G06F 3/0653; G06F 3/0604; G06F 3/0619; G06F 3/0631; G06F 2201/82

USPC ........................................................ 714/6.22
See application file for complete search history.

(56) References Cited

U.S. PATENT DOCUMENTS

| | | | |
|---|---|---|---|
| 9,465,560 B2 | 10/2016 | Galloway et al. | |
| 9,641,615 B1 | 5/2017 | Robins et al. | |
| 10,120,769 B2 | 11/2018 | Sreedhar et al. | |
| 2017/0163730 A1* | 6/2017 | Baptist | H04L 67/1004 |
| 2017/0315745 A1* | 11/2017 | Agombar | G06F 3/0689 |
| 2018/0074879 A1 | 3/2018 | Khadiwala et al. | |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Yair Leibovich
(74) *Attorney, Agent, or Firm* — Timothy T. Singleton (57) ABSTRACT

Method and system are provided for handling an underperforming drive in a redundant array of independent disks (RAID) operating a distributed sparing mechanism. The method includes marking an underperforming drive in the array as resting and allocating distributed spare space of the array for data of operations to the resting drive. A data structure is designated to track operations diverted to the distributed spare space from the resting drive. If the resting drive is recovered, the method rebuilds data to the recovered drive from the distributed spare space by reference to the data structure.

19 Claims, 6 Drawing Sheets

UNDERPERFORMING DRIVE HANDLING IN REDUNDANT ARRAYS

BACKGROUND

Computer disk drives occasionally experience glitches of slow performance. When data is striped across multiple drives such as in a RAID array, one slow drive eventually slows down input/output (IO) to all the drives in the array. Current underperforming drive handling, referred to as component-in-doubt, uses a RAID technique where a drive is temporarily omitted from a RAID array's I/O to enable it to be tested and/or rested, after which it is either brought back into full use in the array or "failed" and ejected from the RAID array to be replaced by a spare drive.

Component-in-doubt acts as a form of artificial, temporary, drive failure, in which I/O to the drive is omitted and reconstructed using parity for reads and for writes has its omission recorded in metadata in a data structure so any later reads of that data can be ensured to be reconstructed later on from parity and without reading from the omitted device. When the drive is deemed "recovered" then its data can be rebuilt from parity from other strips in the stride and from the metadata of the data structure and written to the original addresses. Use of this component-in-doubt technique reduces the level of redundancy in order to maintain latency by avoiding the delay of the writes to the slow drive.

SUMMARY

According to an aspect of the present disclosure there is provided a computer-implemented method for handling an underperforming drive in a redundant array of independent disks (RAID) operating a distributed sparing mechanism, comprising: marking an underperforming drive in the array as resting; allocating distributed spare space of the array for data of operations to the resting drive; and designating a data structure to track operations diverted to the distributed spare space from the resting drive; and wherein, if the resting drive is recovered, rebuilding data to the recovered drive from the distributed spare space by reference to the data structure.

According to another aspect of the present disclosure there is provided a system for handling an underperforming drive in a redundant array of independent disks (RAID) operating a distributed sparing mechanism, comprising: a processor and a memory configured to provide computer program instructions to the processor to execute the function of the components: a resting indicating component for marking an underperforming drive in the array as resting; an allocating component for allocating distributed spare space of the array for data of operations to the resting drive; and a data structure component for designating a data structure to track operations diverted to the distributed spare space from the resting drive; and a rebuilding component for, if the resting drive is recovered, rebuilding data to the recovered drive from the distributed spare space by reference to the data structure.

According to a further aspect of the present disclosure there is provided a computer program product for handling an underperforming drive in a redundant array of independent disks (RAID) operating a distributed sparing mechanism, the computer program product comprising a computer readable storage medium having program instructions embodied therewith, the program instructions executable by a processor to cause the processor to: mark an underperforming drive in the array as resting; allocate distributed spare space of the array for data of operations to the resting drive; and designate a data structure to track operations diverted to the distributed spare space from the resting drive; and wherein, if the resting drive is recovered, rebuild data to the recovered drive from the distributed spare space by reference to the data structure.

BRIEF DESCRIPTION OF THE DRAWINGS

The subject matter of the present disclosure is particularly pointed out and distinctly claimed in the concluding portion of the specification. The disclosure, both as to organization and method of operation, together with objects, features, and advantages thereof, may best be understood by reference to the following detailed description when read with the accompanying drawings.

Embodiments of the present disclosure are described, by way of example only, with reference to the following figures in which.

It should be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The present disclosure relates to storage drives, and more specifically, to handling an underperforming drive in a redundant array of independent disks (RAID). The present disclosure relates further to a related system for handling underperforming drives in a RAID array, and a computer program product A method and system are described for handling an underperforming drive in a RAID storage system operating a distributed sparing mechanism. The method and system mark an underperforming drive as resting (e.g., a resting drive or a drive in a resting state) while it is tested or reset and I/O operations to the resting drive are directed to an allocated distributed spare space. A data structure is used to record references to track the data that is sent to the distributed spare space.

If the resting drive comes back online, the data that has been the subject of I/O operations while it was resting can be recovered from the distributed spare space with reference to the data structure. If the resting drive fails, the drive's data may be entirely rebuilt into a distributed spare using parity. The data that has been handled by the described method may not be rebuilt by this process as it is already stored in the distributed spare space.

Distributed sparing is a technique that distributes rebuild areas across the member drives in an array instead of having a single spare drive. This removes the need for a separate drive that is designated as the spare and that is idle until a failure occurs. Using distributed sparing, data can be copied faster to the rebuild areas and redundancy is restored much more rapidly. The performance of the pool is also more uniform because all of the available drives are used for every volume extent.

Distributed sparing is known in distributed RAID (DRAID) in which RAID arrays are distributed over a larger set of drives. For example, a RAIDS array with 8 drives having the data striped across them with each stripe having a data strip on 7 of the drives and a parity strip on the 8th, may be distributed across 64 drives.

Figure 1:
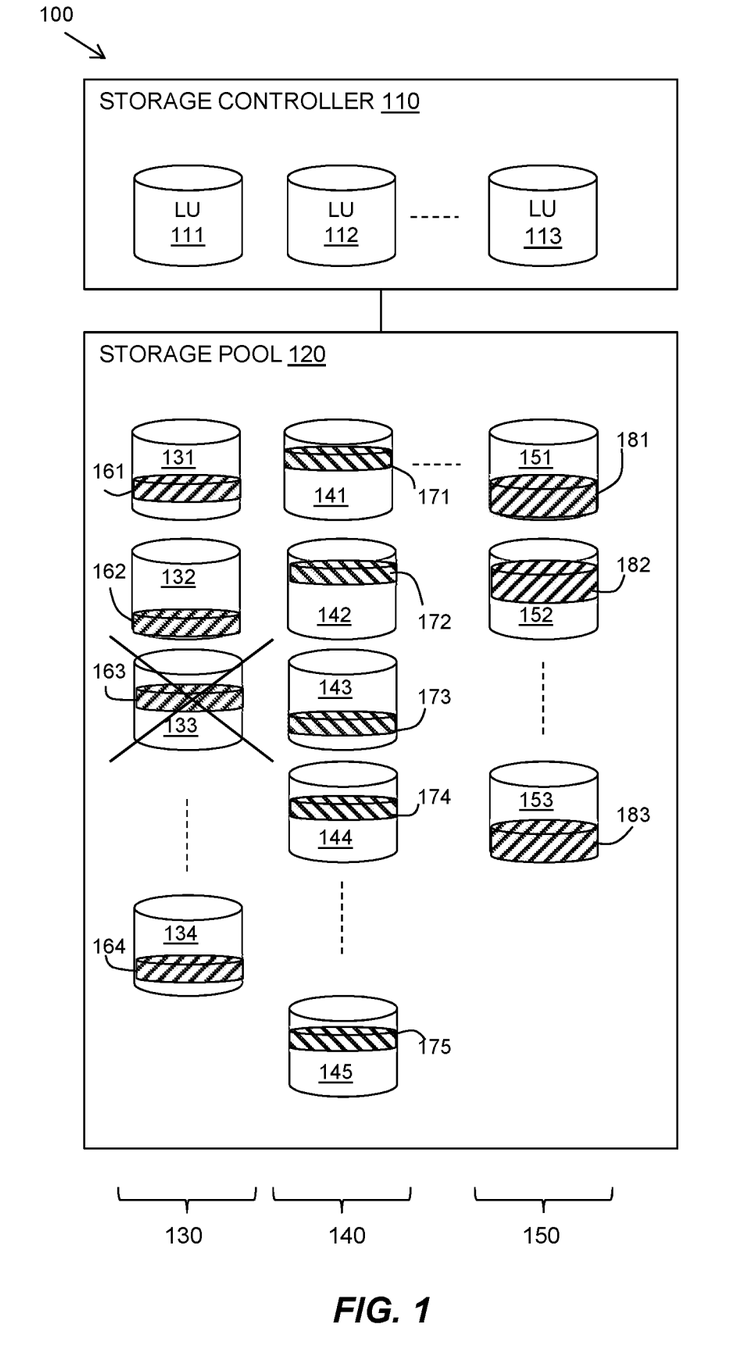
FIG. 1 is a flow diagram of an example embodiment of a storage system including a storage array with distributed sparing in which the present disclosure may be implemented.

Referring to FIG. 1, a storage system 100 is shown as an example storage system with distributed sparing in which the described method may be implemented. The storage system 100 may include a storage controller 110 and a storage pool 120. The storage controller 110 may be provided via a network such as a storage area network (SAN) and the storage pool 120 may be distributed across multiple systems, which may also be provided via a network. The storage controller 110 may provide storage functionality to multiple host devices.

The storage pool 120 may include multiple storage drive arrays 130, 140, 150, for example, in the form of RAID arrays which may be DRAID arrays spread over a larger number of disks (not shown in this figure). Each storage drive array 130, 140, 150 may be referenced by a logical unit number (LUN) 111, 112, 113 as used by the storage controller 110. Each storage drive array 130, 140, 150 may include multiple disk drives, 131-134, 141-145, 151-153. A data operation reads or writes to a stride which is comprised of data strips and one or more parity strips, with each strip being on exactly one disk drive.

Distributed spare storage is a method in which a portion of each of the member drives is allocated to act as a logical spare area. When the logical spare areas of all the drives in an array are combined together, they act as the equivalent of a spare drive. For example, if there is an array of N drives, then if each drive sets aside 1/Nth of its space towards a distributed spare, then when a drive fails, all remaining drives take part in the drive rebuild. This is illustrated as spare areas 161-164 of a first array 130 (e.g., storage drive array 130), spare areas 171-175 of a second array 140 (e.g., storage drive array 140), and spare areas 181-183 of a third array 150 (e.g., storage drive array 150). It should be noted that there may be multiple chunks of spare areas in a drive. The amount of spare space provided by distributed spares in an array may combine to equal one or more spare drives of space.

In distributed sparing, using a spare drive does not occupy a new physical spare drive. Instead, there is a distributed logical spare made up from reserved slices of each of the drives participating in the RAID array. As these drives are already active, this space is already fully "spun up" and quickly accessible but not normally used until a drive fails.

FIG. 1 illustrates a drive 133 in the first array 130 that is underperforming and for which the described method is used to allow the drive 133 to rest whilst using the distributed spare space 161, 162, 164 for handling I/O operations to the drive 133.

The described method for handling an underperforming drive in a RAID array with distributed sparing acts as a tentative failure with immediate allocation/reservation of a distributed spare when a drive goes "slow". All new data written to the "slow" drive is sent to the distributed spare in a standard format. This has an advantage that as drives that are failed are often done so after a drive has been in doubt and tested, there may be a head start of the sparing process as the spare already has all the data on it that was written during the drive testing period, as well as data that has been read and pre-emptively reconstructed using parity. If hard failures do occur, the spare may be repurposed then, as the parity is still all maintained as consistent, and there are markers for all the data areas that have been written to. The spare drive can be repurposed at any time and at short notice.

Figure 2:
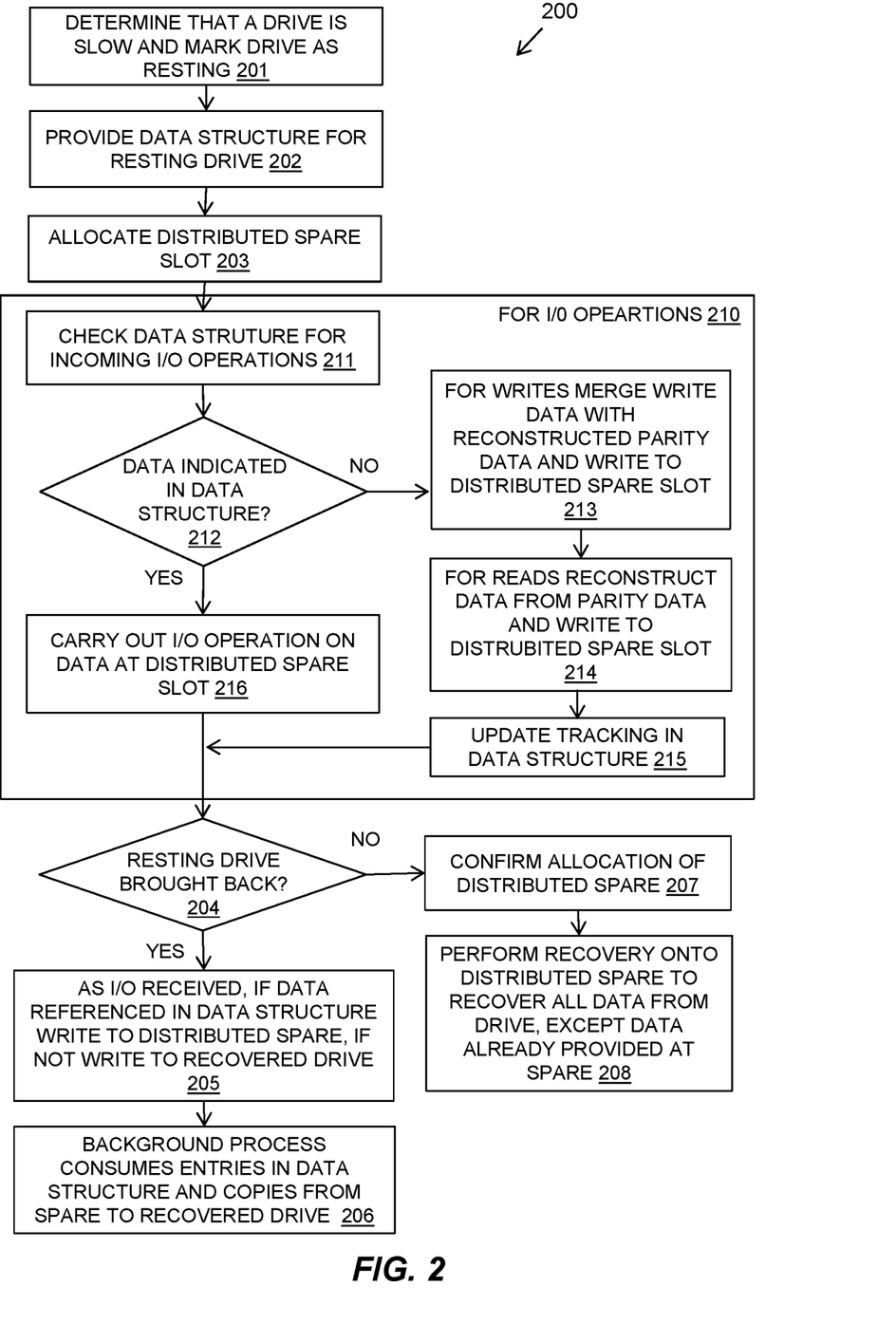
FIG. 2 is a flow diagram of a method for handling an underperforming drive in a RAID array, in accordance with an embodiment of the present disclosure.

Referring to FIG. 2, a flow diagram 200 shows an example embodiment of the described method in a RAID system operating a distributed sparing mechanism. In operation 201 a drive is determined to be performing slowly and impacting I/O operations. This may be determined by applying some criteria to the maximum length of an overall I/O process on the RAID array. The drive is allowed to temporarily rest from the host workload and a number of tests and resets may be performed on the drive. The drive is marked as resting (e.g., a resting drive). Marking the drive as resting may be performed by modifying a state of the drive or modifying one or more indicators, accessible to other drives in the RAID array. The one or more indicators, reflecting that the drive is resting, may be identified by the other drives in the RAID array.

In operation 202, a data structure is provided for tracking reads and writes received for a drive that is marked as resting. The data structure may be any suitable resource in the storage system and many different implementations are envisaged.

In operation 203, the method allocates a distributed spare slot for the resting drive. Rebuild areas in a distributed sparing mechanism are a valuable resource since they part of the physical capacity of the component drives but do not provide capacity to the overall array. This allocation reserves one or more of the rebuild areas to this process and records the reference such that it is not "double booked".

In operation 210, an I/O operation, in the form of a data read or write, may arrive for the drive that is marked as resting. The system may derive the fact that the operation accesses a strip on a drive marked as resting from the array geometry. In some embodiments, the array geometry indicates the strip based on a drive location, within the RAID array, associated with the resting drive.

In operation 211, the data structure is checked to determine if an I/O operation has been received for this strip of data since the drive has been marked as resting. In operation 212, reception of the I/O operation by the data structure is checked by determining if the data location for the I/O is indicated in the data structure.

For writes, if this strip of data has not been written to since the drive has been resting, the strip may be reconstructed, as in operation 213, from the parity and other data in the strips and merged with the new write data and written to the allocated distributed spare slot. In some embodiments, the content of the data is generated from parity "inline" such that it can be merged with the new data from the client. This additional cost may only be for one strip per stride of host data, for example, $1/128$ th. The additional cost may be small enough to be functionally or almost functionally irrelevant, compared to traditional methods where redundancy is lost and operations must be performed to reconstruct and to recover data. In operation 214 for reads, if this strip of data has not been read since the drive has been resting, the read data is reconstructed from the parity and other data in the strips and written to the allocated distributed spare slot. In some embodiments, operation 214 is performed by identifying activity within a record of the drive, and determining whether read activity has been performed.

In some embodiments, the method uses the "same place" as where the data would be if the resting drive had failed permanently and rebuilt into the rebuild area. In storage subsystems, the device's capacity is frequently subdivided into atomic "blocks" and their block index is used to "address" the storage for reads and writes. The described method therefore may use the same address in the rebuild area for this update while resting as if the device had been failed into the area as part of a full rebuild.

In operation 215, for both read and write I/O operations, the data structure is updated to reference the data location. In some embodiments, in operation 215, the method tracks that the spare has valid data for reference for later incoming operations.

In operation 212, the method determines, from the data structure, that an I/O operation has already been carried out on the data stride since the drive has been resting. In such instances, the method may carry out the I/O operation 216 directly at the data of the distributed spare slot. If the data structure indicates that a write for the data has already been received since the drive was marked as resting, then the new host data may be written directly to the allocated distributed spare slot at the correct address. Similarly, for a read, if the data structure for the read address is set, then the required data is read from the correct address within the distributed spare slot.

RAID algorithms are varied but those that use checksums or parity over a data set typically have two methods to update the array. The first is that the client provides all the data in the dataset and the array calculates a new parity or check sum and writes it to disk. This is referred to as "parity compute" as the client provides all the data protected by a particular parity or checksum.

The second is that the client does not provide all the data and the array has to calculate the update to parity. Typically, the remaining data may be read from disk and the array can calculate an incremental parity change and apply that, referred to as "parity increment". Which method is chosen depends on the size of the update from the client relative to the array's geometry (i.e. the number of strips in the data stripe that comprises the parity unit).

This is normal processing for the array regardless of spare activity. However, applying the technique selectively within the described method creates the data for a resting drive necessary to be stored without redundancy loss by using a distributed spare.

Referring back to FIG. 2, in operation 204, the method determines whether the resting drive is recovered and brought back into regular use. Where the resting drive is determined to have been brought back into use, as I/O operations are received, the data structure is checked, at operation 205. Where the updated data is referenced in the data structure, the new data is written to the distributed spare. For other data not referenced in the data structure, in operation 205, data is written into the recovered drive. In some embodiments, a background operation is performed. In such instances, in operation 206, a background process consumes entries in the data structure and copies them from the distributed spare to the recovered drive, removing them from the data structure as the copies complete.

If the resting drive is not brought back into use as it has failed, the allocation of the distributed spare may be confirmed 207 for the now failed drive and a rebuild recovery is performed onto the allocated distributed spare to recover 208 all the data from the now failed drive, except for data already provided in the distributed spare during the "resting" phase. Recovery of the remaining data on the failed drive to the allocated distributed spare space is carried out by referencing the data structure to determine the remaining data on the failed drive that is not already present in the allocated distributed spare space due to activity when the failed drive was marked as resting. This reduces the domain of a recovery by comparison of the failed drive and the data structure references to locations of data operations already carried out to the allocated distributed spare space during the resting phase of the drive. In an example in which the data structure is a bit map, the data that needs to be rebuilt is computed by bitwise operations.

The method requires at least one data structure for tracking data in the storage array. The data structure may have at least the same number of entries as the array has strips. In one embodiment, the data structure may be a bitmap of the same granularity as the array strip length and the method may be carried out sharing this resource.

In another embodiment, the data structure may be a bitmap with each bit representing a chunk of the strip with each region being referred to as a grain. In such an embodiment, the relationship between the granularity of data in the data structure and that of the array is not equal, such that the data structure allocated can have a finer grain. For example, a strip size might be 64 kilobytes but the data structure might be 4 kilobytes.

A smaller grain size may be chosen, such as 32 units of a usual array strip of length 256 units, (which may be referred to as a "chunk"). Then instead of checking the presence of the strip index in the data structure, it would need to work out whether the chunk(s) that is (are) updated by the write to the array are present in the data structure. The embodiment would only need to copy and merge 32 units of data to keep up to date instead of 256.

The method may be extended to limit the scope and recovery cost of each "resting phase" by making the data structure have a finer grain. The size of the grain may be chosen to balance the cost/benefit of large/small grains.

In one embodiment, the data structure for tracking the I/O operations to the resting drive may be a data structure (for example, a bitmap) having grains whereby the writing of any data to a grain causes the system to check using parity and reconstruct data for the corresponding strip in the array. In such an embodiment, a grain size may be determined at array creation time, or at some convenient configuration moment where the required resources can be configured.

For I/Os that come in that are larger than one grain or are a non-integer number of grains these can be split into I/Os that are wholly within a single grain and processed as below. This is standard across behavior for I/O operations to a RAID array that may be extended into this functionality.

The described method of FIG. 2 may be further described using the grains as follows.

If a write for a grain has not already been received since the drive was marked as resting, then the write is promoted to the size of the grain of the data structure that tracks what writes have been received since the drive was marked as resting. This is done by performing a standard reconstruct of the required grain from non-resting members of the array.

If a write for the grain has already been received since the drive was marked as resting, then the new host data may be written directly to the allocated distributed spare.

For each read that comes in, if the data structure for the grain encompassing the read address is set, then read from the distributed spare, else reconstruct the stride using a standard reconstruct of the read data from the other strips in the stride and return the read data to the host.

If the size of the area read covers (or if it is worth promoting to) the size of the data structure grain, then the method may write the reconstructed grain to the distributed spare and mark the data structure to indicate the spare now contains valid data.

Recovery Phase

When the slow drive has had the reset and/or test operations completed then a recovery phase is entered.

If the drive is deemed to be failed and set for expulsion from the array then, the allocation of the distributed spare is confirmed so that it cannot be poached by other "real" failures.

Recovery is performed onto the distributed spare making use of the data structure constructed as described above, to enable recovery to only have to be performed on portions or grains of the data structure that have not already passed through the process.

If the drive has recovered, when a next I/O operation is received, the data structure is checked to determine if the data structure is marked. In the case of the embodiment using a data structure of grains, this may include the following steps.

If the I/O is marked for at least one grain that is marked in the data structure and the I/O is a read, then the method continues to send reads to the distributed spare (note an I/O larger than a grain may have to be split up). If the read is large enough (or invites promotion to) cover a full grain then when returning the data to the host, the whole grain's data is written to the recovered drive and the bit in the data structure cleared for that grain.

If the I/O is for at least one grain that is marked in the data structure and the I/O is a write then, if the write is large enough (or invites promotion to) cover a full grain then write whole grains of data to the recovered drive, clear the data structure bits for these whole grains.

For fractions of whole grains (not promoted) then if these grains are present on the distributed spare (the data structure has a mark set for them) then update the distributed spare, else update the recovered drive. If a fraction of a grain write is deemed worth promoting, then if the grain is on the distributed spare then read the complement of the grain's data from the distributed spare and write the whole grain to the recovered drive and clear the data structure flag for this grain.

Additionally, to handle host I/O (but coordinated with it using locks on data structures as appropriate), for each grain present in the data structure, copy the grain's data onto the recovered drive and clear the bit in the data structure.

Drive Failure

If a real hard drive failure occurs to any other drive, the method may advantageously select a distributed spare that is not currently being used in the process described above.

If there is no such available distributed spare then, if there are distributed spare slots being used for the resting drive, select the distributed spare for the failed drive with the least number of markers set in the data structure for use as a spare. The data structure may then be re-purposed to be a traditional component-in-doubt bitmap i.e. it now indicates strides where the parity does not match the data on the slow drive and revert to the conventional component-in-doubt process in which the I/O to the drive is omitted and marked in the bitmap, kept idle or indeed deallocated according to the wishes of the embodiment according to other concerns. The distributed spare is handed over to the normal spare pool for use in drive recovery.

For RAID operating distributing sparing, the described method and system for handling underperforming drives have a number of operational improvements over known methods.

There is no loss of redundancy which enables a breakthrough of the limitation of the number of underperforming drives in a stride being constrained by the number of parity flags used in a stride.

If desired, this method can operate in parallel to conventional component-in-doubt processes to enable the number of underperforming drives in a stride to be a maximum of spares and parities.

As a spare drive is large enough to hold 100% of an underperforming drive's content then, depending on the grain size used in the data structure, there is less constraint on how long a drive can rest and thus how many writes are received while it is resting and have to be handled.

In a conventional component-in-doubt process, data is reconstructed afresh every time it is read during the slow period. The described method generally avoids the need for second reconstructs.

If a drive is failed out the backend of the resting process, the method has a head start on the drive sparing and recovery process. It does not have to use preemptive reconstruct (for example, reading 11* as much data) for data that has been written since the drive went slow. The data that has been written is already present on the spare at the correct location so does not have to be copied there. Some of the data that has been read (sequential reads or reads approaching grain size) is already present on the spare.

One scenario in which the effectiveness of the described method can be illustrated, is where drives in the form of flash drives undergoing a firmware update result in multiple internal reboots with a progression to failure.

Depending on other aspects of an embodiment, if such a flash drive is about to be downloaded, the system might potentially mark this device as "resting" before it starts to underperform. However, this is not required, and an embodiment might start the process by detecting severely elevated latency as the device applies its firmware image and temporarily ceases to respond to initiator commands.

As soon as the device is resting the embodiment in this scenario starts to benefit the user by following the process to mark where grains are updated during the firmware reboot. Because of the speed of these devices many such grains can occur in the cases where reboots take many tens of seconds. If the new firmware image decides the device has failed and the drive never exits the download process as a valid member of the array, the method has obtained a head start on the distributed rebuild that follows.

Figure 3:
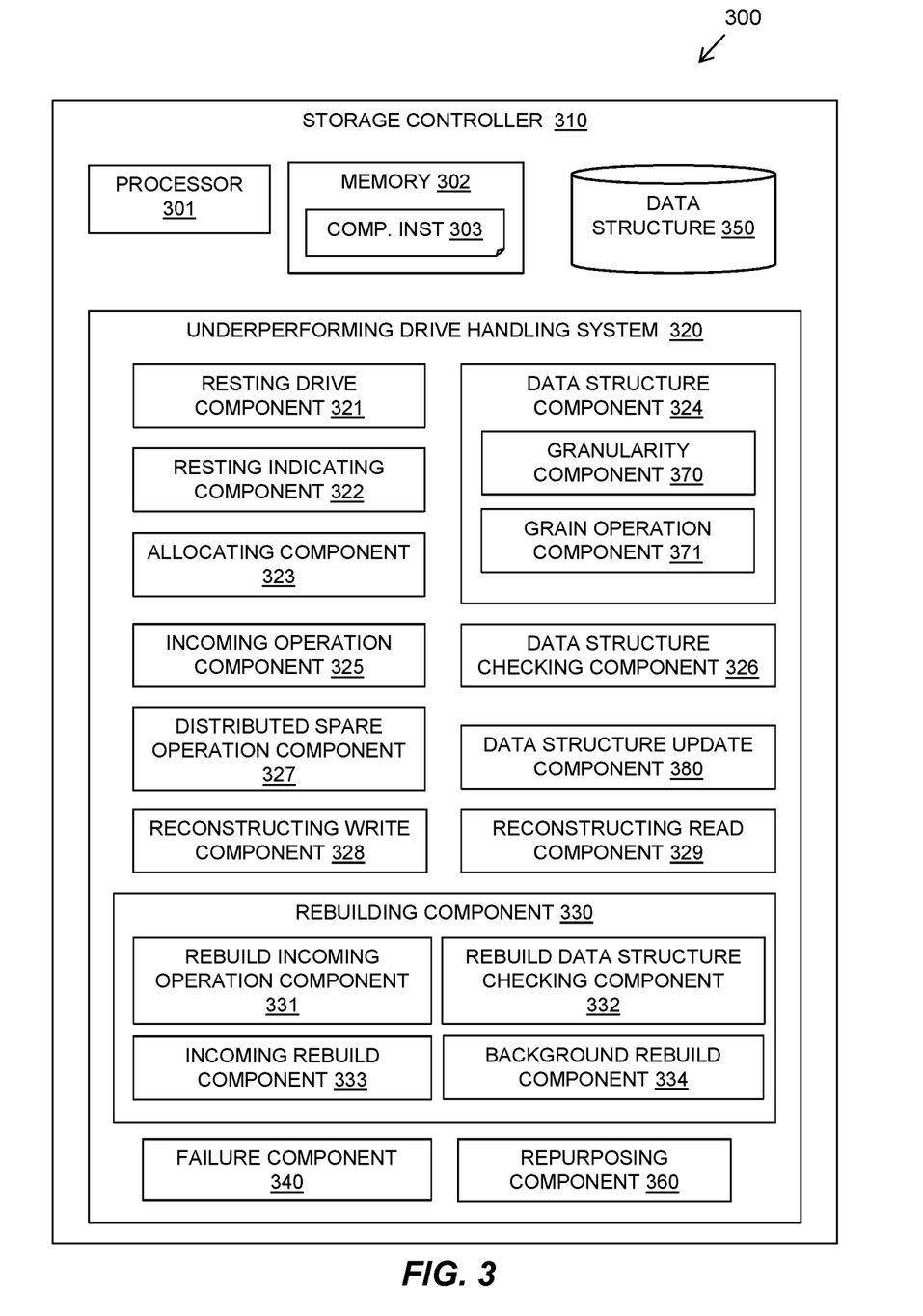
FIG. 3 is block diagram of a system for handling an underperforming drive in a RAID array, in accordance with an embodiment of the present disclosure.

An example system embodying the described method is now described. Referring to FIG. 3, a block diagram 300 shows an example embodiment of a storage controller 310 of the described storage system. The storage controller 310 may include at least one processor 301, a hardware module, or a circuit for executing the functions of the described components which may be software units executing on the at least one processor. Multiple processors running parallel processing threads may be provided enabling parallel processing of some or all of the functions of the components. Memory 302 may be configured to provide computer instructions 303 to the at least one processor 301 to carry out the functionality of the components.

The storage controller 310 includes an underperforming drive handling system 320 for handling an underperforming drive in a redundant array of independent disks (RAID) operating a distributed sparing mechanism.

The underperforming drive handling system 320 may include a resting drive component 321 for determining that a drive is underperforming, a resting indicating component 322 for marking an underperforming drive in the array as resting, and an allocating component 323 for allocating distributed spare space of the array for data of operations to the resting drive.

The underperforming drive handling system 320 may include a data structure component 324 for designating a data structure 350 to track operations diverted to the distributed spare space from the resting drive.

The data structure component 324 may include a data structure granularity component 370 for defining the data structure with a granularity finer than the length of strips in the array and a grain operation component 371 for carrying out operations for a grain promoted to the size of the grain in the data structure.

The underperforming drive handling system 320 may include an incoming operation component 325 for receiving an incoming operation to a stride including data on the resting drive and a data structure checking component 326 for determining if an indication is provided in the data structure that the data has been operated on since the drive has been resting.

The underperforming drive handling system 320 may include a reconstructing write component 328 for reconstructing a stride of data from parity and other data across a same stride in the array of drives and merging the reconstructed data with the incoming write data. This is used for write operations where the data structure indicates that the data has not written to since the drive has been resting.

The underperforming drive handling system 320 may include a reconstructing read component 329 for reconstructing a stride of data from parity and other data across a same stride in the array of drives. This is used for read operations where the data structure indicates that the data has not been read since the drive has been resting.

The underperforming drive handling system 320 may include a distributed spare operation component 327 for performing the operation on the data at the allocated distributed spare space. This is used to write reconstructed data from the reconstructing write component 328 and reconstructing read component 329 to the distributed spare space and if the data structure indicates that the data has already been operated on since the drive has been resting. The underperforming drive handling system 320 may include a data structure update component 380 for updating the data structure to reference the data location of operations to the distributed spare space.

The underperforming drive handling system 320 may include a rebuilding component 330 for, if the resting drive is recovered, rebuilding data to the recovered drive from the distributed spare space by reference to the data structure 350.

The rebuilding component 330 may include a rebuild incoming operation component 331 for receiving an incoming operation to a stride including data on the recovered drive and a rebuild data structure checking component 332 for determining if an indication is provided in the data structure that the data has been operated on since the drive has been marked as resting. An incoming rebuild component 333 is provided for writing data to the distributed spare space if the data was operating on since the drive has been marked as resting, otherwise, writing the data to the recovered drive. A background rebuild component 334 may also be provided for copying data from the distributed spare space to the recovered drive by referencing the data structure and using locks on the data structure to coordinate with incoming operations, and removing references in the data structure for successfully copied data to the recovered drive.

The underperforming drive handling system 320 may include a failure component 340 for, if the resting drive fails, performing recovery of the remaining data on the failed drive to the allocated distributed spare space.

The underperforming drive handling system 320 may also include a repurposing component 360 for, in the event of the allocated distributed spare space being needed for a failed drive, repurposing the data structure for recording metadata of omitted operations to strides including data on the resting drive.

Figure 4:
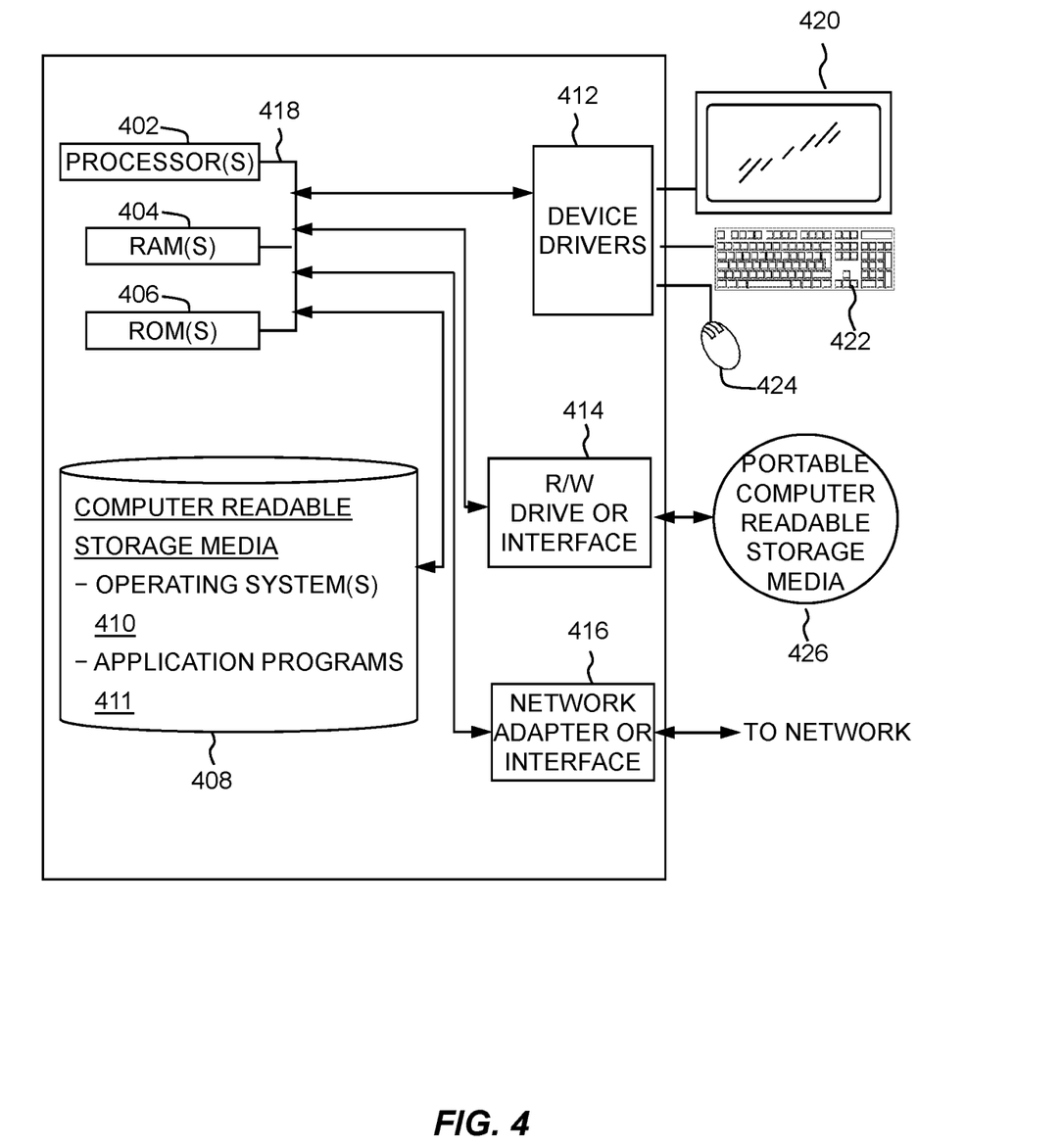
FIG. 4 is a block diagram of a computer system in which handling an underperforming drive in a RAID array may be implemented, in accordance with an embodiment of the present disclosure.

FIG. 4 depicts a block diagram of components of the computing device of the storage controller 310 of FIG. 3, in accordance with an embodiment of the present disclosure. It should be appreciated that FIG. 4 provides only an illustration of one implementation and does not imply any limitations with regard to the environments in which different embodiments may be implemented. Many modifications to the depicted environment may be made.

Computing device can include one or more processors 402, one or more computer-readable RAMs 404, one or more computer-readable ROMs 406, one or more computer readable storage media 408, device drivers 412, read/write drive or interface 414, and network adapter or interface 416, all interconnected over a communications fabric 418. Communications fabric 418 can be implemented with any architecture designed for passing data and/or control information between processors (such as microprocessors, communications and network processors, etc.), system memory, peripheral devices, and any other hardware components within the system.

One or more operating systems 410 and application programs 411 are stored on one or more of the computer readable storage media 408 for execution by one or more of the processors 402 via one or more of the respective RAMs 404 (which typically include cache memory). In the illustrated embodiment, each of the computer readable storage media 408 can be a magnetic disk storage device of an internal hard drive, CD-ROM, DVD, memory stick, magnetic tape, magnetic disk, optical disk, a semiconductor storage device such as RAM, ROM, EPROM, flash memory, or any other computer readable storage media that can store a computer program and digital information, in accordance with embodiments of the disclosure.

Computing device can also include a R/W drive or interface 414 to read from and write to one or more portable computer readable storage media 426. Application programs 411 on computing device can be stored on one or more of the portable computer readable storage media 426, read via the respective R/W drive or interface 414 and loaded into the respective computer readable storage media 408.

Computing device can also include a network adapter or interface 416, such as a TCP/IP adapter card or wireless communication adapter. Application programs 411 on computing device can be downloaded to the computing device from an external computer or external storage device via a network (for example, the Internet, a local area network or other wide area networks or wireless networks) and network adapter or interface 416. From the network adapter or interface 416, the programs may be loaded into the computer readable storage media 408. The network may comprise copper wires, optical fibers, wireless transmission, routers, firewalls, switches, gateway computers and edge servers.

Computing device can also include a display screen 420, a keyboard or keypad 422, and a computer mouse or touchpad 424. Device drivers 412 interface to display screen 420 for imaging, to keyboard or keypad 422, to computer mouse or touchpad 424, and/or to display screen 420 for pressure sensing of alphanumeric character entry and user selections. The device drivers 412, R/W drive or interface 414, and network adapter or interface 416 can comprise hardware and software stored in computer readable storage media 408 and/or ROM 406.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It should be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It should also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud Computing

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
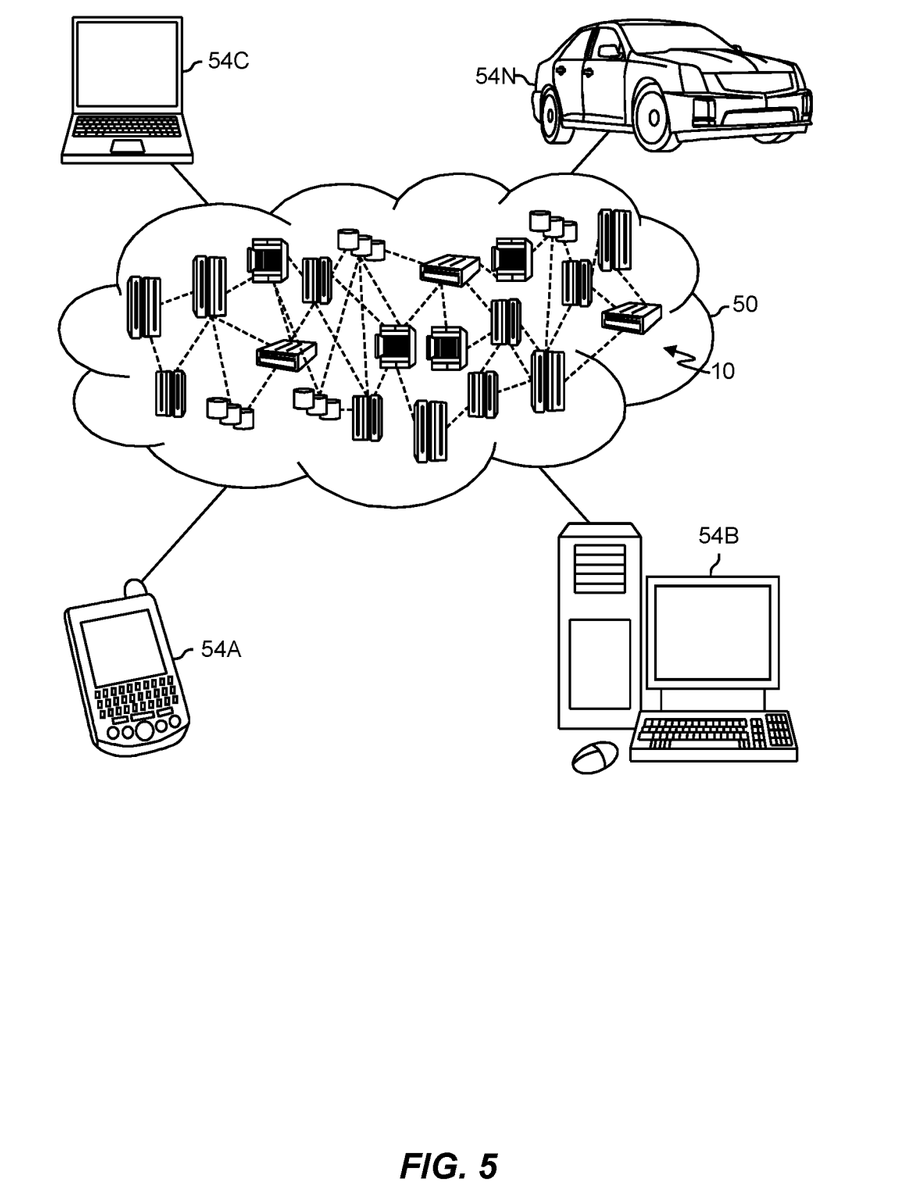
FIG. 5 is a schematic diagram of a cloud computing environment in which inventive concepts of the present disclosure may be implemented, in accordance with an embodiment of the present disclosure.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
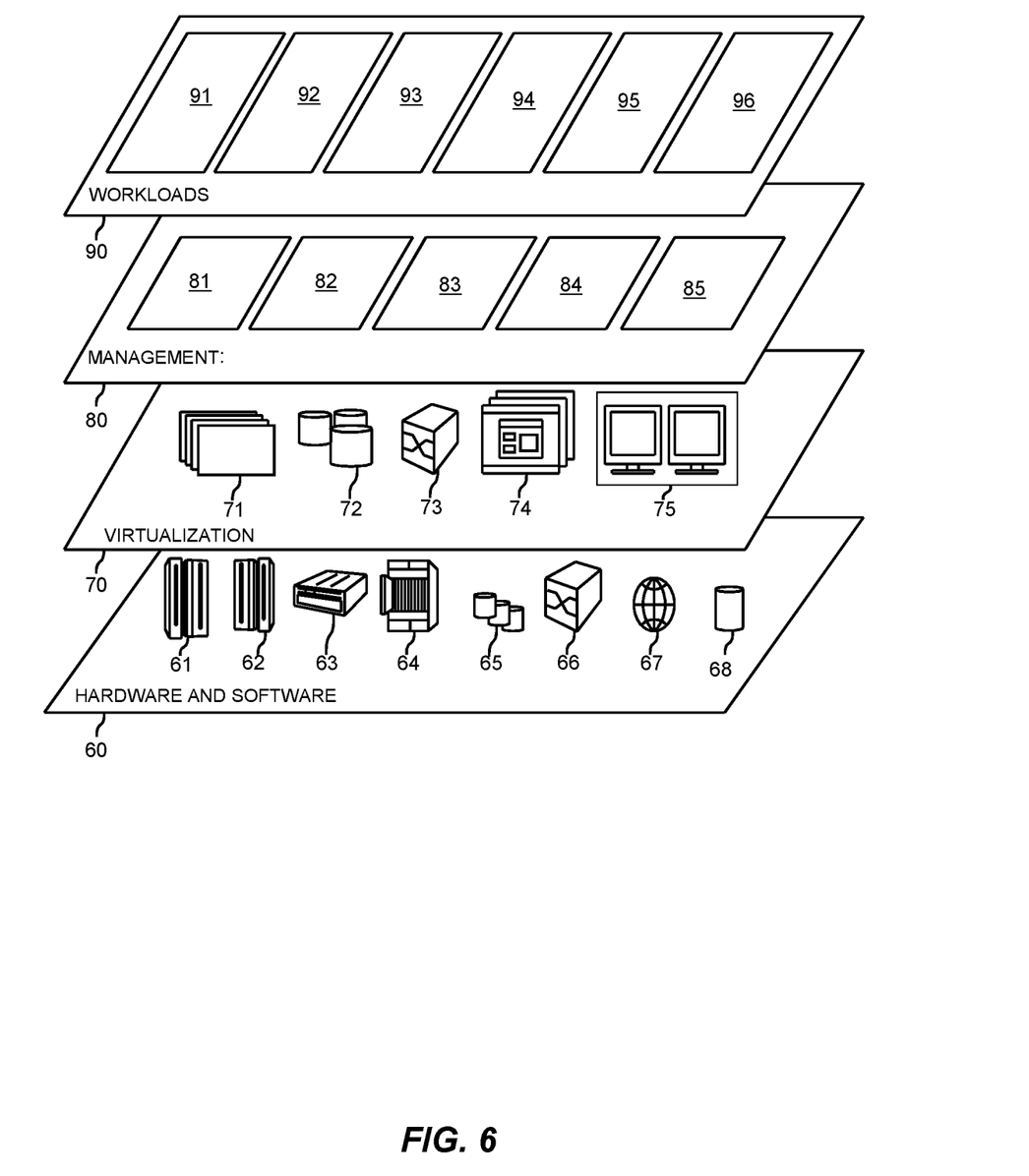
FIG. 6 is a diagram of model layers of a cloud computing environment in which inventive concepts of the present disclosure may be implemented, in accordance with an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storage controller processing 96.

The descriptions of the various embodiments of the present disclosure have been presented for purposes of illustration, but are not intended to be exhaustive or limited to the embodiments disclosed. Many modifications and variations should be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

What is claimed is:

1. A computer-implemented method for handling an underperforming drive in a redundant array of independent disks (RAID) operating a distributed sparing mechanism, comprising:
    marking an underperforming drive in the array as a resting drive;
    allocating distributed spare space of the array for data of operations to the resting drive;
    designating a data structure to track operations diverted to the distributed spare space from the resting drive;
    receiving an incoming operation to the data on the resting drive;
    determining if an indication is provided in the data structure that the data has been operated on since the drive has been resting; and
    if the data has been operated on, performing the operation on the data at the allocated distributed spare space; and wherein,
    if the resting drive is recovered, rebuilding data to the recovered drive from the distributed spare space by reference to the data structure.

2. The method of claim 1, wherein, if the resting drive fails, performing recovery of remaining data on the failed drive to the allocated distributed spare space by referencing the data structure to determine the remaining data on the failed drive that is not already present in the allocated distributed spare space due to activity when the failed drive was marked as resting.

3. The method of claim 1, wherein, if the data has not been operated on since the drive has been resting, for a write operation with incoming write data:
    reconstructing a strip of data from parity and other data across a same stride in an array of drives;
    merging the reconstructed data with the incoming write data;
    writing the data to the allocated distributed spare space; and
    updating the data structure to reference a data location of the spare space.

4. The method of claim 1, wherein, if the data has not been operated on since the drive has been resting, for a read operation:
    reconstructing a strip of data from parity and other data across a same stride in array of drives;
    writing the data to the allocated distributed spare space; and
    updating the data structure to reference a data location of the spare space.

5. The method of claim 1, wherein rebuilding data to the recovered drive includes:
    receiving an incoming operation to a stride including the data on the recovered drive;
    determining if an indication is provided in the data structure that the data has been operated on since the drive has been resting; and
    if so, writing the data to the distributed spare space, otherwise, writing the data to the recovered drive.

6. The method of claim 5, further comprising:
    as a background process, copying data from the distributed spare space to the recovered drive by referencing the data structure and using locks on the data structure to coordinate with incoming operations, and removing references in the data structure for successfully copied data to the recovered drive.

7. The method of claim 1, further comprising:
    in an event of the allocated distributed spare space being needed for a failed drive, repurposing the data structure for recording metadata of omitted operations to strides including data on the resting drive.

8. The method of claim 1, further comprising:
designating a data structure with a granularity of grains in the data structure the same or finer than strip lengths in the array, wherein strips across multiple drives in the array form a stride of data.

9. The method of claim 8, wherein the granularity of grains of the data structure is finer than strip lengths in the array and the method includes computational updates to adjust for different in granularity for a data operation and a rebuild operation of the resting drive.

10. The method of claim 1, wherein the method diverts operations to the distributed spare space using an address that would be used if the resting drive had failed and was being rebuilt at the distributed spare space.

11. A system for handling an underperforming drive in a redundant array of independent disks (RAID) operating a distributed sparing mechanism, comprising:
one or more processors; and
a computer-readable storage medium, coupled to the one or more processors, storing program instructions that, when executed by the one or more processors, cause the one or more processors to perform operations comprising:
marking an underperforming drive in the array as a resting drive;
allocating distributed spare space of the array for data of operations to the resting drive;
designating a data structure to track operations diverted to the distributed spare space from the resting drive;
receiving an incoming operation to the data on the resting drive;
determining if an indication is provided in the data structure that the data has been operated on since the drive has been resting; and
if the data has been operated on, performing the operation on the data at the allocated distributed spare space, and for writing reconstructed read and write data for data that has not yet been operated on; and wherein,
if the resting drive is recovered, rebuilding data to the recovered drive from the distributed spare space by reference to the data structure.

12. The system of claim 11, further comprising:
if the resting drive fails, performing recovery of remaining data on the failed drive to the allocated distributed spare space by referencing the data structure to determine the remaining data on the failed drive that is not already present in the allocated distributed spare space due to activity when the failed drive was marked as resting.

13. The system of claim 11, further comprising:
for writing reconstructed read and write data for data that has not yet been operated on,
updating the data structure to reference a data location for new data written to the allocated distributed spare space.

14. The system of claim 13, further comprising:
reconstructing a strip of data from parity and other data across a same stride in an array of drives;
merging the reconstructed data with incoming write data of a write operation; and
writing the data to the allocated distributed spare space.

15. The system of claim 13, further comprising:
reconstructing a strip of data from parity and other data across a same stride in an array of drives; and
writing the data to the allocated distributed spare space.

16. The system of claim 11, wherein rebuilding data to the recovered drive further comprises:
receiving an incoming operation to the data on the recovered drive;
determining if an indication is provided in the data structure that the data has been operated on since the drive has been marked as resting;
writing data to the distributed spare space if the data was operating on since the drive has been marked as resting, otherwise, writing the data to the recovered drive;
copying data from the distributed spare space to the recovered drive by referencing the data structure and using locks on the data structure to coordinate with incoming operations; and
removing references in the data structure for successfully copied data to the recovered drive.

17. The system of claim 11, further comprising:
in an event of the allocated distributed spare space being needed for a failed drive, repurposing the data structure for recording metadata of omitted operations to strides including data on the resting drive.

18. The system of claim 11, wherein the operations further comprising:
defining the data structure with a granularity of grains of the data structure finer than strip lengths in the array; and
carrying out operations for a grain promoted to a size of the grain in the data structure.

19. A computer program product for handling an underperforming drive in a redundant array of independent disks (RAID) operating a distributed sparing mechanism, the computer program product comprising a computer readable storage medium having program instructions embodied therewith, the program instructions executable by a processor to cause the processor to perform operations comprising:
marking an underperforming drive in the array as a resting drive;
allocating distributed spare space of the array for data of operations to the resting drive;
designating a data structure to track operations diverted to the distributed spare space from the resting drive;
receiving an incoming operation to the data on the resting drive;
determining if an indication is provided in the data structure that the data has been operated on since the drive has been resting; and
if the data has been operated on, performing the operation on the data at the allocated distributed spare space; and wherein,
if the resting drive is recovered, rebuilding data to the recovered drive from the distributed spare space by reference to the data structure.

\* \* \* \* \*